Nov. 13, 1928.

W. E. HOLLAND 1,691,806

ELECTROLYTIC RECTIFIER

Filed Jan. 13, 1923    3 Sheets-Sheet 1

Inventor.—
Walter E. Holland.
by his Attorneys.—
Howson & Howson

Nov. 13, 1928.

W. E. HOLLAND

ELECTROLYTIC RECTIFIER

Filed Jan. 13, 1923

1,691,806

3 Sheets-Sheet 3

Inventor-
Walter E. Holland.
by his Attorneys.
Howson & Howson

Patented Nov. 13, 1928.

1,691,806

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

ELECTROLYTIC RECTIFIER.

Application filed January 13, 1923. Serial No. 612,405.

One object of this invention is to provide a novel and relatively simple combination of elements particularly designed for use as an electrolytic rectifier, which shall include a novel arrangement and construction of electrodes especially designed with a view to the prolongation of their useful life, while permitting of their convenient removal and replacement.

It is further desired to provide a rectifier or other asymmetric cell including an electrode of novel composition, giving not only highly efficient operation but increased durability, and the invention also includes such a construction and mounting of the electrodes as will cause open circuiting of the cell without injury to said electrodes when the electrolyte evaporates or has its level otherwise reduced below a predetermined point.

Another object of the invention is to provide a novel form of cover structure for supporting the electrodes and receiving a resistance element such as a lamp and which shall include novel means for anchoring certain electric conductors included in the circuit with which said cell is associated.

Figure 1:
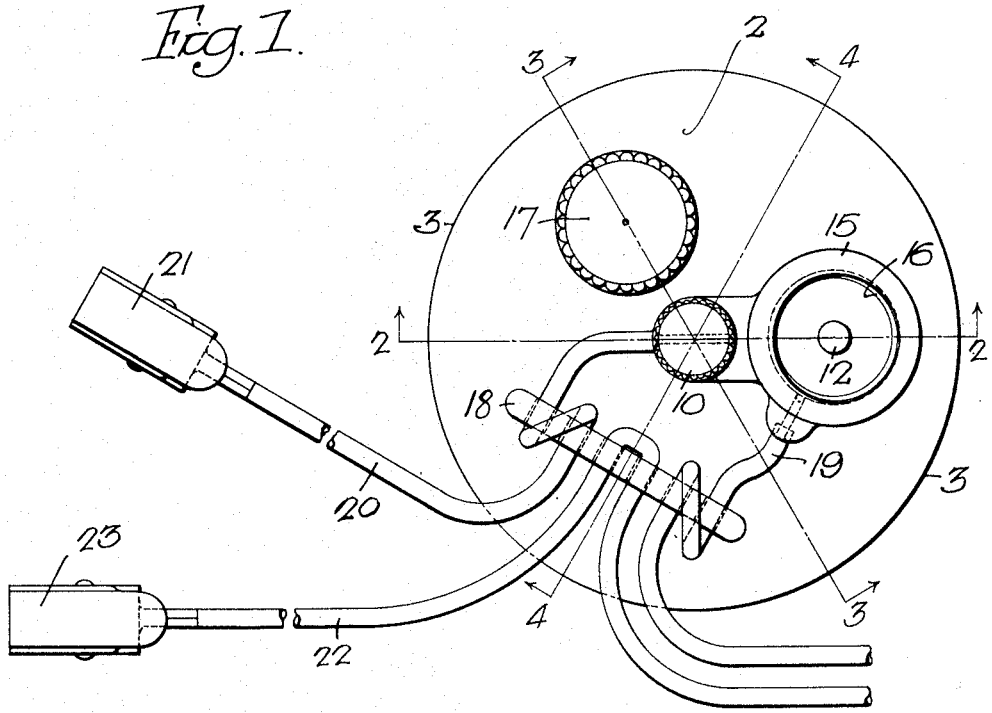
Figure 2:
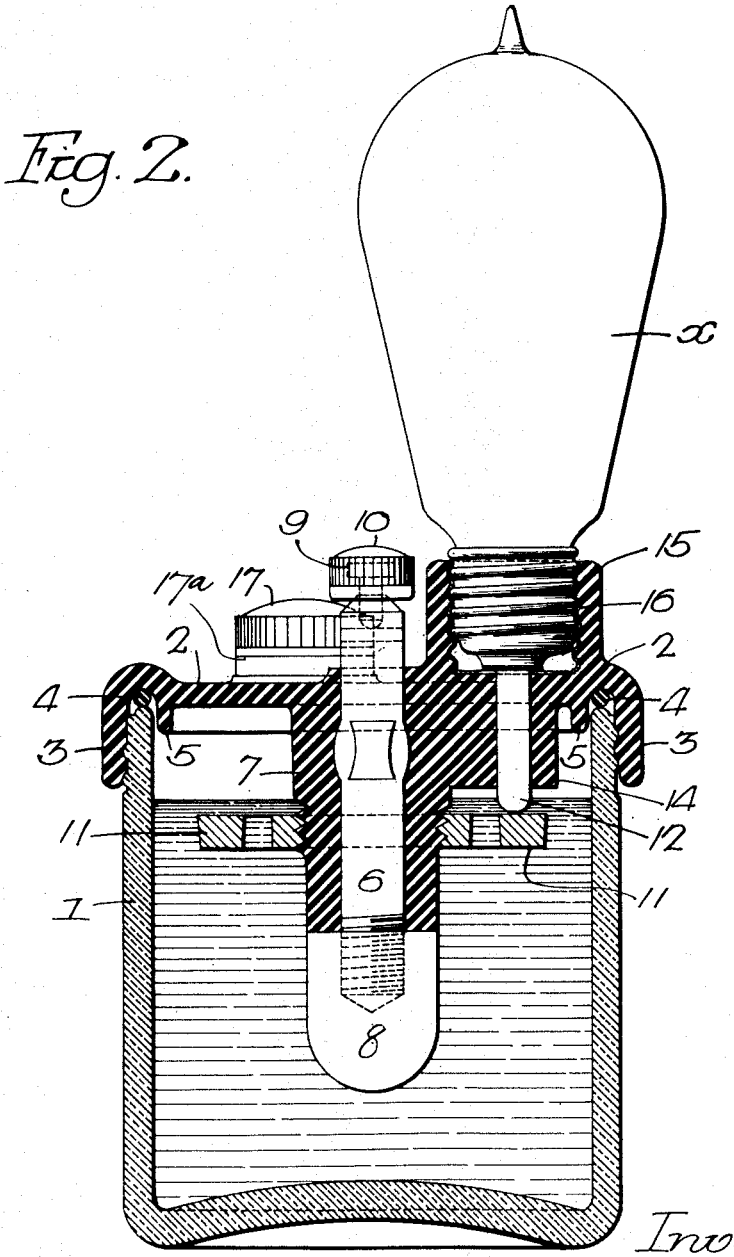
Figure 3:
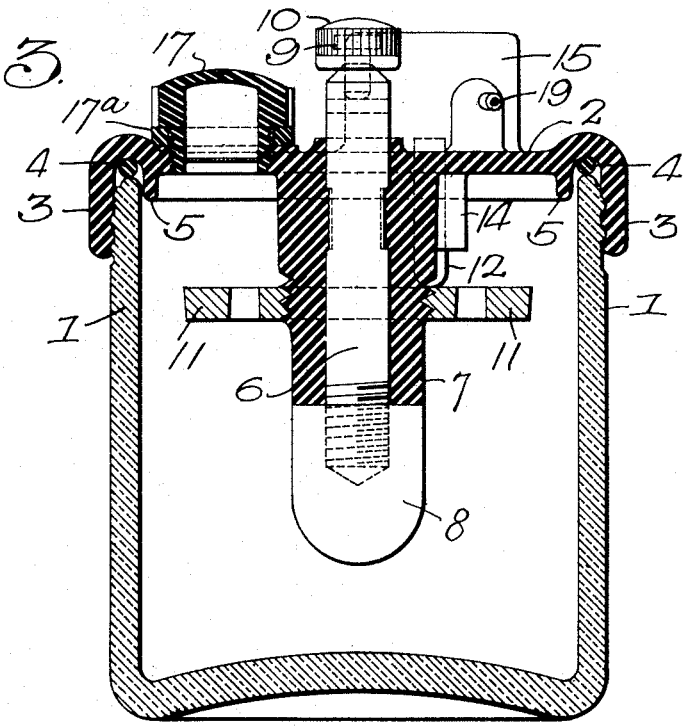
Figure 4:
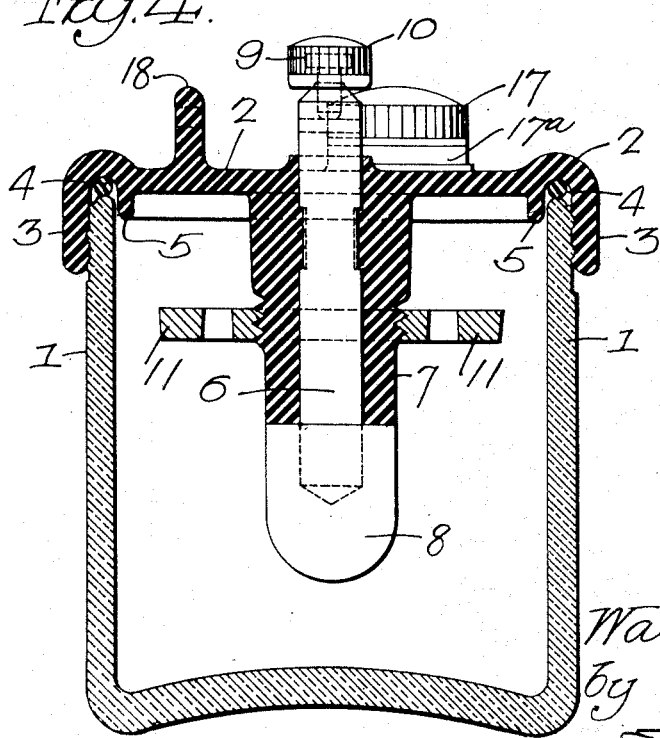

These objects and other advantageous ends I attain as hereinafter set forth, reference being had to the accompanying drawings, in which, Fig. 1 is a plan of my electrolytic cell, showing certain of the electric conductors associated therewith; and Figs. 2, 3 and 4 are vertical sections respectively taken on the lines 2—2, 3—3 and 4—4, Fig. 1.

In the above drawings, 1 represents a suitable container such as a glass metal rubber jar having a molded cover 2 formed with a downwardly projecting flange 3 internally threaded to removably engage threads formed on the container adjacent its top edge. A suitable packing ring 4 of rubber or other yielding material is preferably confined between the cover and the top edge of the container, being seated in an annular groove defined by the flange 3 and an annular rib 5 within and substantially concentric therewith.

In accordance with my invention, I mold in cover 2 a rod or bar 6 of aluminum projecting at right angles to the plane of the cover, which is provided with an integral, downwardly-extending tubular extension making a liquid tight contact with the said rod. The cover is preferably made of some non-conducting, impervious material such as hard rubber or that substance known to the trade as "bakelite" and in any case the rod 6 includes a portion imbedded in said cover or in its extension 7, which is preferably flattened or otherwise so formed or held as to effectually prevent both its rotation and longitudinal movement. The lower end of the rod 6 projects beyond the lower end of the tubular or sleeve extension 7 of the cover and is threaded for the reception of a renewable aluminum electrode 8 formed preferably without exposed sharp corners and having substantially the same diameter as the adjacent portion of the extension 7, whose flat lower end it is designed to closely fit.

The upper end of the rod 6 projects above the top surface of the cover 2 and has a transverse passage for the reception of a wire or other conductor, being also axially recessed and threaded for the reception of a suitable binding screw 9 whose head is enclosed in and protected by a molded covering 10 of insulating material, preferably milled to permit of its convenient rotative adjustment. The parts are so proportioned that the electrode 8 is supported centrally within the container 1 below the normal solution level but away from bottom thereof, and above this electrode the sleeve or cover extension 7 is externally threaded for the reception of a disc 11 constituting the second electrode of the cell and in accordance with my invention made of an alloy of iron and silicon such, for example, as the class of alloys which are known commercially under the name "Duriron" and which have a silicon content ranging upwardly from approximately 10%, the high limit of silicon being determined ordinarily by the physical rather than the chemical characteristics of the electrode. A representative electrode found satisfactory in practice of the present invention contains approximately 14% silicon. A typical example of Duriron presents the following analysis:

| | Per cent. |
|---|---|
| Silicon | 14.25 |
| Iron | 84.5 |
| Carbon, manganese and other elements | 1.25 |

The invention is not limited, however, to the foregoing illustrative data, the essential feature residing in a relatively high silicon content as compared with that of common commercial irons and steels, such for example as transformer core steel which may contain approximately 5% silicon.

This disc is designed to be engaged by the rounded lower end of a second rod 12, permanently imbedded in the cover 2 at one side thereof so as to extend substantially parallel to the rod 6,—said cover being preferably thickened to provide a relatively long contact with said rod 12, which projects beyond this thickened portion 14 so that, by properly screwing the disc 11 upwardly on the sleeve extension 7, it may be brought into forcible engagement and caused to make electrical contact with said rod. The upper end of the rod 12, which also may be of iron-silicon alloy, projects centrally into the bottom of a hollow cylindrical upward extension 15 of the cover having a threaded metallic shell inserted in and permanently held to its side walls so as to constitute with said rod a receptacle or socket capable of receiving a standard electric lamp $x$ whose threaded base will electrically engage and fit into the shell 16 when its central contact engages the exposed upper end of the rod 12.

As shown in Fig. 3, the cover 2 may be provided with a threaded opening for the reception of a vented cap 17 having a packing ring or gasket 17$^a$ confined between its head and the adjacent surface of the cover. Also projecting upwardly from the top of the cover there may be an integral, more or less elongated, rib or cleat 18 having six or any other suitable number of transverse passages therethrough and constituting an anchoring device for a number of insulated electrical conductors operatively associated with the rectifier.

Of these conductors, one, indicated at 19 (Fig. 1), enters the side of the cylindrical receptacle extension 15 and is electrically connected, as by soldering or brazing, to the terminal shell 16 therein. This conductor passes through two of the holes in the anchor cleat 18, as shown, and is designed for connection to one terminal of an alternating current supply circuit. A second electrical conductor 20 passes through two other of the holes in the anchor cleat and has one end clamped to the post 6 by the binding screw 9. The opposite end of this conductor is provided with a terminal clip 21 for connection with the storage battery or other device to be supplied with uni-directional current from the rectifier. A third conductor 22 has one end connected to the second terminal of the alternating current circuit and after passage through two others of the holes in the anchor cleat 18 has connected to its free end a second connection clip 23 for coaction with the second terminal of the device to be supplied with direct current.

Under conditions of use, the container 1 is filled with a suitable electrolyte such as a solution of phosphoric acid or of a soluble phosphate, borate or carbonate salt up to a level above the top surface of the electrode constituted by the disc 11. An incandescent lamp having a resistance suited to the capacity of the rectifier, is screwed into the receptacle so as to electrically connect the rod 12 with the shell 16 and hence with the conductor 19. If now the two conductors 19 and 22 be connected to a suitable source of alternating current and the attachment clips 21 and 23 be connected to a device such as a storage battery which is to receive unidirectional current, the rectifier will operate on the valve principle in the well-known manner.

It is particularly to be noted that all parts of the aluminum-electrode 8 subjected to electrolytic action are completely submerged in the electrolyte so that the usual excessive wear or deterioration of the aluminum occurring at the surface of the electrolyte in former types of cell is prevented. If by reason of decomposition, evaporation or any other cause, the level of the electrolyte should be lowered below the bottom surface of the electrode 11, the rectifier is automatically open-circuited without possibility of damage to the aluminum electrode 8 which, in rectifiers as hitherto made, is subjected to injurious corrosion owing to the increasing concentration of the electrolyte solution as the liquid level falls and before the cell ceases to function. In the case illustrated, no injury occurs to the electrode 11 if made of a suitable iron-silicon alloy, so that the construction described automatically prevents injury as above noted.

If after long-continued use the aluminum electrode becomes worn away to an objectionable extent, it may be conveniently removed and a new electrode placed upon the threaded end of the central rod 6. By reason of the fact that the electrode 11 is mounted on the threaded extension of the cover, it may also be removed for cleaning or replacement and may be adjusted so as to be maintained in forcible contact with the lower end of the rod 12. Water may be added to the cell or the electrolyte may be changed through the filling opening which is normally closed by the vent cap 17.

From the above description it will be appreciated that my rectifier is not only of simple and rugged construction, but by reason of the arrangement and form of the electrodes will remain in serviceable condition for long periods of time. By employing a lamp as a resistance element and mounting this directly on the rectifier in a receptacle forming part of the cover and utilizing as one of its terminals, the conducting rod 12, the device is rendered self-contained, convenient and particularly adapted for use by unskilled persons. This construction also permits of the use of the lamp as a switch to open and close the circuit by loosening or tightening said lamp in the socket; and by the use of lamps of different resistances the current output of the rectifier may be regulated.

By the use of an iron-silicon alloy of the "Duriron" class in the second electrode, opposed to the rectifying electrode, the corrosion of said second electrode is much reduced and its useful life greatly increased as compared with lead, iron or carbon electrodes heretofore used.

I claim:

1. An asymmetric cell including a non-film-forming electrode of iron containing at least 10% silicon.

2. An asymmetric cell having two kinds of electrodes, of which one is aluminum and the other an alloy of iron containing at least 10% of silicon.

3. As a new article of manufacture, a non-film-forming electrode for asymmetric cells consisting of an iron alloy containing at least 10% of silicon.

4. As a new article of manufacture, a non-film-forming electrode for asymmetric cells consisting of an iron alloy containing approximately 14% silicon.

5. As a new article of manufacture, a non-film-forming electrode for asymmetric cells consisting of an iron alloy containing approximately 84% of iron and 14% of silicon.

6. An asymmetric cell comprising a container, a film-forming electrode mounted in said container, a second electrode, and a body of electrolyte, the active portion of said second electrode being arranged so that its lowest point lies adjacent the normal initial surface level of said electrolyte in the cell, whereby a predetermined drop in the electrolyte from said normal initial level interrupts the operation of the cell.

7. An asymmetric cell comprising a container, a body of electrolyte, an electrode mounted in said container adjacent the normal initial surface level of the electrolyte, and a film-forming electrode so mounted in said container that its active portion is entirely below the electrode first named.

8. A current rectifier comprising a container, an aluminum electrode mounted in the container, a second electrode mounted so as to be situated entirely above the aluminum electrode, and a body of electrolyte in the container submerging said electrodes, the latter being positioned to cause the rectifier to be open circuited when the level of the electrolyte falls, before uncovering the aluminum electrode.

9. The combination in a current rectifier of a container; a cover of insulating material therefor having a downward extension within the container; a horizontally extending electrode mounted on said extension; and a second electrode carried by the cover wholly at a level below said first electrode.

10. A current rectifier consisting of a container; a cover of insulating material therefor having a downward extension; a plate threaded on said extension; a conductor mounted in the cover and engaging the plate; and a second electrode in the container below said plate.

11. A current rectifier consisting of a container; a cover of insulating material therefor having a downward extension; a plate threaded on said extension; a conductor mounted in the cover and engaging the plate; a second electrode in the container below said plate; and a second conductor projecting through the extension and in electrical engagement with the second electrode.

12. The combination in a current rectifier of a container; a cover of insulating material therefor; central and side conductors respectively extended vertically through the cover into the container; an electrode plate carried by the cover and engaging the side conductor; and a second electrode removably mounted on the central conductor below the plate.

13. The combination in a current rectifier of a container; a cover of insulating material therefor; two rods extending vertically within the container; a plate horizontally mounted coaxially with but insulated from one of said rods and engaging the other rod to constitute one of the electrodes of the rectifier; and a second electrode removably mounted on the first rod.

14. A current rectifier consisting of a container; a cover of insulating material therefor including a portion forming the body of a receptacle; a threaded shell constituting one of the terminals of said receptacle; a conductor constituting the second terminal of the receptacle and projecting into the container; and electrodes in the container of which one is connected to said conductor.

15. A current rectifier consisting of a container; a cover therefor including a portion forming a receptacle body; two terminals in said receptacle body; electrodes in the container of which one is connected to one of said terminals; with a third terminal on the cover connected to the second electrode.

16. The combination in a current rectifier of a container; a cover of insulating material therefor; two substantially parallel rods mounted in the cover; two electrodes within the container electrically connected to said rods respectively; and a receptacle on the cover having two terminals of which one is provided by the upper end of one of said rods.

17. A current rectifier consisting of a container; a cover of insulating material therefor having a tubular extension within the container; a rod mounted in said extension and having a threaded lower end; an aluminum electrode removably mounted on the threaded end of said rod; a second rod molded in the cover; and a second electrode in the form of a plate threaded on the extension of said cover and bearing against said second rod.

18. A current rectifier consisting of a container; a cover of insulating material therefor having a tubular extension within the container; a rod mounted in said extension and having a threaded lower end; an aluminum electrode removably mounted on the threaded end of said rod; a second rod mounted in the cover; and a plate of iron-silicon alloy threaded on the extension of said cover and bearing against said second rod.

19. A current rectifier consisting of a container; a cover of insulating material therefor; a centrally placed conducting rod mounted in said cover; two coaxial electrodes carried by the cover, of which one is mounted on said rod; and a receptacle carried by the cover having a terminal in electrical connection with the second one of said electrodes.

20. A current rectifier consisting of a container; a cover of insulating material therefor having a filling opening; a centrally placed conducting rod mounted in said cover; two coaxial electrodes carried by the cover, of which one is mounted on said rod; a receptacle carried by the cover having a terminal in electrical connection with the second one of said electrodes; and a cap normally closing said opening of the cover.

WALTER E. HOLLAND.